United States Patent Office 3,618,360
Patented Nov. 9, 1971

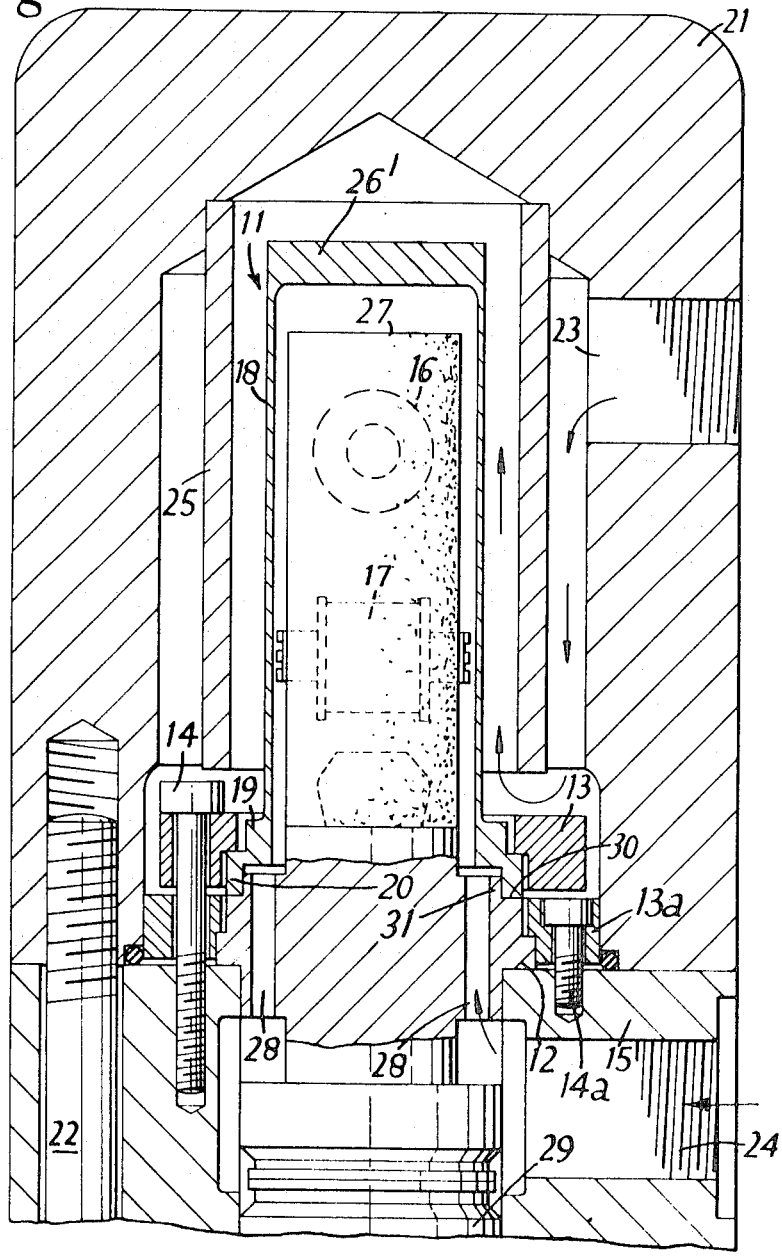

3,618,360
TRANSDUCERS SUITABLE FOR USE IN MEASURING THE DENSITY OF OR THE PRESSURE OR A PRESSURE DIFFERENCE IN FLUIDS
Ian F. M. Curtis, Farnborough, England, assignor to The Solartron Electronic Group Limited, Farnborough, England
Filed Aug. 28, 1969, Ser. No. 853,915
Claims priority, application Great Britain, Aug. 30, 1968, 41,645/68
Int. Cl. G01n 9/00, 29/02; G01f 1/00
U.S. Cl. 73—32                                    35 Claims

ABSTRACT OF THE DISCLOSURE

A transducer for measuring fluid density or pressure or pressure difference has a hollow cylindrical body with integral circuit flanges at one end. The flanges overlap axially of the body to provide an elastically flexible connection therebetween. In use, the body is set into vibration while in contact with fluid so that the frequency of the vibration is affected by the density or pressure or pressure difference in the fluid. One of the flanges establishes a node at the corresponding end of the hollow body, and the other flange enables the hollow body to be mounted on a supporting structure without interfering with the node-forming flange.

FIELD OF THE INVENTION

This invention relates to transducers suitable for use in measuring the density of or the pressure or a pressure difference in fluids.

The invention relates particularly to such transducers of the type in which there is a hollow body capable of being set into vibration and, in use, the fluid or fluids are supplied to internal and/or external surfaces of the body so that a frequency of the vibration is a measure of a fluid density or pressure or pressure difference. A known transducer of this type for measuring pressure or pressure difference is described in U.S. patent specification No. 3,021,711, and U.S. patent specification No. 3,516,283 by William Edward Abbotts entitled "Methods and Apparatus for Measuring the Densities of Fluids" describes a transducer of the said type for measuring the density of a fluid.

It has been found that under some conditions the repeatability of measurements with the known transducers is no better than 0.1% of full scale reading. Furthermore dismantling, cleaning and re-assembling of such a transducer has been found to cause changes of about 0.2% of full scale reading for a given pressure or density condition as the case may be.

It is an object of the present invention to provide in a transducer of the said type a hollow body having, so far as its use in measuring fluid density, pressure, or pressure difference is concerned, a high Q, low mechanical hysteresis, good insulation from interfering mechanical noise, and good repeatability of response.

Briefly a transducer according to the present invention includes a hollow body, a relatively rigid base member, means for exciting natural vibration of a relatively resilient wall of the hollow body, the said body being associated with means for generating a signal representative of a frequency of the said vibration, and a mounting structure. The said body has a relatively rigid node-forming portion. The mounting structure is connected to the node-forming portion and secured to the base member. The connection of the mounting structure to the node-forming portion is elastically flexible. In use the hollow body is placed in contact with the fluid in such a way that the density of or the pressure or a pressure difference is the fluid as the case may be affects the frequency of vibration.

The elastic flexibility of the said connection and the provision of a distinct node-forming structure and a distinct mounting structure enables the objects of the invention to be achieved.

A high Q is achieved by means of the present invention because, it is thought, the elastically flexible connection and distinctness of the node-forming portion and the mounting structure results in a substantial reduction in the passage of energy from the hollow body to the base member by comparison with the previous transducers utilising a hollow body. The reasons for the achieving of the other objects of the invention are not fully understood at present.

Embodiments may be constructed in which a cylindrical relatively resilient wall connects the mounting structure to the node-forming portion.

In a preferred embodiment in which the hollow body is of right cylindrical form, the node-forming portion and the mounting structure can be circular flanges, the mounting flange having an internal diameter equal to the external diameter of the node-forming flange, and the flanges being integral at a region where they overlap axially of the tubular body. The said base member in this embodiment is provided with a circular locating portion which fits into the mounting flange, the means for exciting vibrations and the means for generating a signal being mounted on the base member so as to be disposed correctly relative to the tubular member when the mounting flange is fitted on to the circular locating portion of the base member. With such an embodiment a repeatability of measurements of approximately 0.01% of full scale reading can be achieved and the changes in reading for a given pressure or density as the case may be for dismantling, cleaning and re-assembling can be as low as approximately 0.01% of full scale reading.

Another embodiment in which the mounting structure is integral with the node-forming portion the mounting structure may be shaped to constitute a three-point support bearing against the said base member of the transducer.

It is preferred that the hollow body be tubular. Where an embodiment with a tubular hollow body is intended to be used in measuring the density of a fluid it is preferable for the tubular body to be open at the other end, that is, the end remote from the mounting structure, and to have a further node-forming portion at the said other end.

An additional advantage is provided in a preferred embodiment in which the hollow body is disengageably mounted in a first protective housing, and means for exciting natural vibration and the means for generating a signal are electrical, an amplifier is housed in a second protective housing which is disengageably secured to the first protective housing, and the amplifier is disengageably connected both to the means for exciting natural vibration and to the means for generating a signal in such a manner that the said vibration can be maintained by feedback through the amplifier and the amplifier can be disconnected from both of the said means by separating the second protective housing from the first protective housing. This construction enables replacement or servicing of either the first housing and its contents or the second housing and its contents to be carried out quickly and easily. Where mere replacement is required, an unskilled person can be allowed to do the job. Furthermore, the hollow body can be disposed within a structure inside the first housing which structure supports one or more filters. The design of this structure can be such that the filter across the input passage for the fluid to be investigated is also easily removable without exposing the hollow body, thus making the replacement or cleaning of this filter a task which can be left to an unskilled person.

BRIEF DESCRIPTION OF THE DRAWINGS

FIG. 5 is a longitudinal sectional view of part of a transducer for measuring gas pressure or difference in gas pressure and embodying the invention.

DESCRIPTION OF PREFERRED EMBODIMENTS

Figure 1:
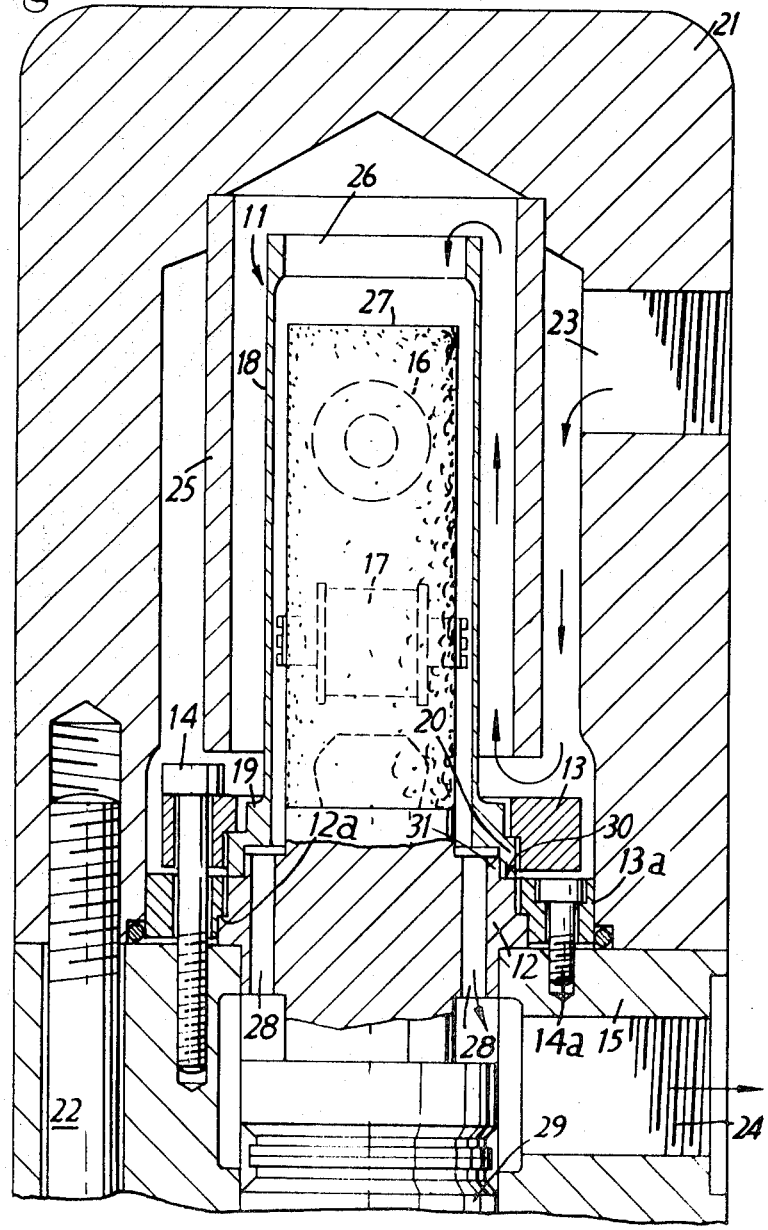
FIG. 1 is a longitudinal sectional view of part of a transducer for measuring gas density and embodying the invention.

FIG. 1 shows in section part of a transducer for measuring the density of a fuel-gas supply. The transducer includes a cylindrical hollow body 11 secured to a base member 12 by means of a first clamping ring 13 and three bolts, one 14 of which is shown, the bolts being screwed into a base flange 15. The base member 12 is secured to the base flange 15 by means of a second clamping ring 13a, which bears against an annular shoulder 12a formed on the member 12, and three bolts, one 14a of which is shown, these bolts being screwed into the base flange 15. A drive coil 16 and a pick-up coil 17 serve respectively as means for exciting natural vibration of a thin cylindrical wall 18 of the body 11 and means for generating a signal representative of a frequency of the vibration. The coils 16 and 17 are arranged to operate on the positions of respective antinodes which are equidistant from a nodal line that encircles the wall 18 in operation. At the lower end of the body 11 in FIG. 1 the body has a node-forming portion 19 which is a circular external flange or ring of effectively rectangular section integral with the wall 18. The proportions of the wall 18 and the portion 19 are such that the wall is relatively resilient and the node-forming portion 19 relatively rigid. In operation the portion 19 establishes a nodal line encircling the lower end of the wall 18 in FIG. 1.

Another ring or flange integral with the portion 18 is a mounting structure 20. The connection of the mounting structure 20 to the node-forming portion 19 is provided by a connection means formed by a small region of "overlap" between the rings constituting these two elements where they become integral with one another. The smallness and material of this connection are such that the connection means is elastically flexible and contributes significantly to the attaining of a high Q factor for the hollow body 11. The wall 18, the portion 19, and the structure 20 are coaxial with one another. The material used for the body 11 and the mounting structure 20 is an iron-nickel-chromium alloy known commercially as N-span-C 902 (trademark). The clamping ring 13 bears only on the mounting structure 20, so that the node-forming portion 19 is effectively mounted on a circular "hinge" constituted by the connection means between the mounting structure 20 and the node-forming portion 19. Clearance is provided between the ring 13 and the portion 19, and between the portion 19 and the base member 12. Clearance is provided between the structure 20 and the larger inner cylindrical surface of the ring 13. Thus, the connection means serves to elastically and flexibly support the node-forming portion 19 and its attached wall 18, while assuring that such parts remain free from any direct contact against the base member 12.

The body 11 and the base member 12 are housed in a casing 21 of aluminium or stainless steel to which the base flange 15 is bolted by eight bolts, part of one 22 of which is shown.

An inlet 23 for gas is provided in the casing 21, and an outlet 24 in the base flange 15. The connections to gas supply lines have been omitted for clarity. The path of gas through the transducer is indicated by arrows from the inlet 23 to the outlet 24. A magnetic shield 25 which is a cylindrical steel tube arranged to be coaxial with the body 11 and secured by being pressed into the casing 21, defines part of the path of the gas. As can be seen from the arrows, the shield ensures that the gas flows first over the outer cylindrical surface of the body 11. The body 11 is open at its upper end in FIG. 1 and is provided there with an integral internal flange or ring 26 that serves to define a nodal line encircling that end. The ring 26 is coaxial with the wall 18. The gas enters the open end of the body 11 and flows through the body, in so doing passing over a cylindrical mass 27 of epoxy resin embedding the drive coil 16 and the pick-up coil 17 and supporting them on the base member 12, and through eight holes 28 in the base member 12, two of which are shown, to an outlet chamber in the base flange 15. The outlet 24 connects the outlet chamber to a gas pipe (not shown).

The passage of the gas over the outer cylindrical surface of the body 11 and thence to the interior of the body eliminates pressure difference between the exterior and interior of the body 11. Consequently the wall 18 when vibrating is not affected by the pressure of the gas or by pressure differences but only by the density of the gas.

The pick-up coil 17 is connected to the input of an amplifier (not shown) housed in an amplifier casing (not shown) bolted to the base flange 15 by the bolt 22 and its seven companions. The output of the amplifier is connected to the drive coil 16. The phase difference between the output and input signals of the amplifier is arranged to be such that with the coils 16 and 17 disposed as shown natural vibration of the wall 18 can be maintained by feedback through the amplifier regardless of viscous damping. Oscillation at the natural frequency of resonance of the wall when there is viscous damping is ensured by arranging that the driving force applied by the drive coil 16 is proportional to the velocity of the wall 18 sensed by the pick-up coil 17. The direction of the driving force is arranged in accordance with the desired mode of vibration of the wall 18. The amplifier is provided with output amplitude limitation and is of high enough gain to ensure that output limiting occurs under the severest viscous clamping to be encountered.

The form of the vibration is similar to that found in bells and is known as the "hoop" or radial mode of vibration. The vibration is initiated by spurious electrical noise occurring when the amplifier is energised.

Electrical leads from the coils 16 and 17 pass through the base member 12 to a plug 29 which will be described hereinafter in more detail with reference to FIG. 3.

In one practical embodiment having a hollow body shaped as shown in FIG. 1, the inside diameter of the wall 18 is 0.709 inch (1.80 cm.), the thickness of the wall is 0.006 inch (0.015 cm.), the outside diameter of the portion 18 is 0.901 inch (2.289 cm.), the inside diameter of the ring 26 is 0.628 inch (1.595 cm.) and the axial length from the upper edge of the ring 26 to the lower edge of the portion 19 (relative to FIG. 1) is 2.110 inches (5.359 cm.). This particular practical embodiment is intended for use in measuring gas densities over a range of 0 to 120 milligrams per cubic centimetre. For a full range of 0 to 60 milligrams per cubic centimetre a wall thickness of 0.003 inch (0.0076 cm.) is preferred. It is found that the Q value for the embodiment covering the 0 to 120 milligrams per cubic centimetre range is at least twice that of a prior art transducer for the same range.

The inside diameter of the mounting structure 20 is equal to the outside diameter of the portion 19. The axial length from the upper edge of the ring 26 to the lower edge of the structure 20 (relative to FIG. 1) is 2.210 inches (5.613 cm.). The axial distance from the lower edge of the structure 20 to its upper edge (relative to FIG. 1) is 0.135 inch (0.343 cm.) so that the axial extent of the "overlap" between the portion 19 and the structure 20 is 0.035 inch (0.0889 cm.). The smaller of the two inner diameters of the clamping ring 13 is 0.915 inch (2.324 cm.) so that a clearance of 0.0047 inch (0.018 cm.) is provided between the ring 13 and the node-forming portion 19. The larger of the two inner diameters of the clamping ring 13 is 1.07 inches (2.72 cm.) and the outside diameter of the mounting structure 20 is 1.04 inches (2.64 cm.) so that a clearance of 0.015 inch (0.038 cm.) is provided between the clamping ring 13 and the mounting structure 20, the ring 13 being held substantially coaxial with the hollow body 11 by means of the three bolts securing the ring 13 to the base member 12. Thus there is no radial contact between on the one hand the clamping ring 13 and on the other hand the node-forming portion 19 and the mounting structure 20, the mounting structure 20 being secured to the base member 12 by solely axially directed clamping forces exerted on the mounting structure 20 by the clamping ring and the base member 12.

In the embodiment having the measurements given above the coils 16 and 17 are so placed that their axes are 0.335 inch (0.851 cm.) from a radial plane at 1.162 inches (2.951 cm.) from the lower edge (relative to FIG. 1) of the ring-shaped mounting structure 20, the coils being on opposite sides of the plane. It is believed that with the above dimensions the coils' axes pass through the positions of respective antinodes equidistant from a nodal line that in operation encircles the cylindrical wall 18 of the body 11 where the said plane intersects the body 11.

The coils are thus disposed symmetrically relative to a radial plane lying equidistant from the two portions 19 and 26.

In one preferred mode of vibrations in which there are eight antinodes around the wall 18 to each side of the nodal line, the antinodes being substantially evenly disposed around the axis of the body and being separated by nodal lines. The presence of the nodal lines can be demonstrated by coating the external surface of the wall 18 with lycopodium powder and exciting the natural vibrations. The nodal lines appear as paths where the powder remains or collects on the surface of the wall 18, as with Chladni's figures for vibrating plates.

The axes of the coils 16 and 17 are at right angles to the axis of the body 11 and lie in directions at right angles to one another. The coils have composite magnetic cores, each core consisting of a short permanent magnet with two longer pole pieces.

By experiment a setting for the coils 16 and 17 is found such that their axes lie along those radii at which the power required when the coils are coupled by an amplifier to excite natural vibration of the wall 18 is at a minimum.

The base member 12 provides a flat reference face 30 against which the lower edge of the mounting structure 20 lies. The positions of the axes of the coils 16 and 17 relative to the cylindrical wall 18 of the body 11 are predetermined by their positioning relative to the face 30 of the base member 12 when the coils are embedded in the mass 27 of epoxy resin.

The base member 12 is also provided with a circular locating portion 31 on which the ring-shaped mounting structure 20 fits so that the cylindrical wall 18 of the body 11 is coaxial with the cylindrical mass 27 and the locating portion 31.

In the embodiment having the measurements given above, the annular upper surface of the portion 31 stands 0.07 inch (0.18 cm.) above the face 30, and the lower annular surface of the node-forming portion 19 stands 0.100 inch (0.25 cm.) above the face 30, so that there is a clearance of 0.03 inch (0.08 cm.)

Instead of the drive coil 16 and the pick-up coil 17 being coupled through an amplifier, the drive coil 16 can be driven by a variable frequency oscillator, the pick-up coil 17 then being connected to the input of apparatus suitable for indicating the strength of the signal generated in the pick-up coil by vibration of the resilient wall 18 so that resonance peaks can be detected and the frequency of the oscillator at which the peaks occur recorded.

Other means for exciting vibration include for example mechanisms for striking or bowing the hollow body, loudspeaker types of devices for sonically exciting vibration, and electrostatic means. A signal representative of a frequency of the vibrations can be generated for example by a strain gauge, variable capacitance or inductance sensor, and a photo-electric device in combination with a source of light and means for varying the proportion of light from the source reaching the photo-electric device in dependence upon the predominant frequency of the vibration.

Figure 2:
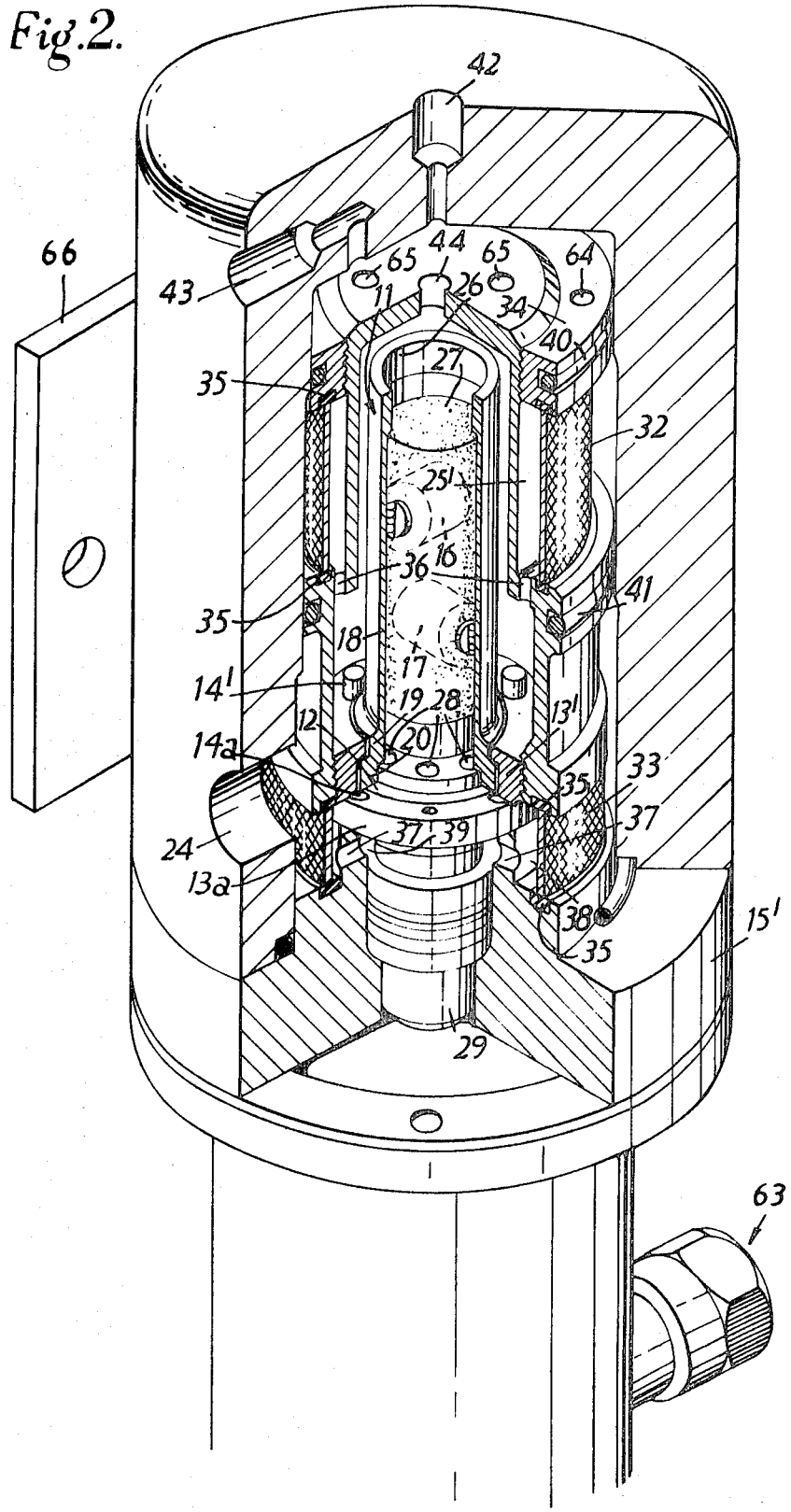
FIG. 2 is a perspective, cut-away view of another gas-density measuring transducer embodying the invention.

FIG. 2 shows, partly cut away, a transducer for measuring gas density and incorporating an inlet filter 32 and an outlet filter 33. Parts of this transducer which correspond exactly to parts of the transducer shown in FIG. 1 have been given corresponding reference numerals.

The filters 32 and 33 are held in place by a magnetic shield 25' that is screw-threadedly engaged with the clamping ring 13' and is coaxial with the wall 18 of the body 11. A locating ring 34 is screw-threadedly engaged with the upper end of the shield 25' in FIG. 2. The ends of the filters 32 and 33 bear against sealing rings 35 of a synthetic polymeric amide known as nylon, these sealing rings being located in grooves in the ring 34, the shield 25', and a base flange 15'.

The shield 25' has two cylindrical portions of differing diameters, the portion of smaller diameter lying within the inlet filter 32. To allow gas to pass from the inlet filter 32 to the body 11, the magnetic shield 25' is provided with eight evenly spaced holes 36 in an annular wall thereof connecting the two cylindrical portions. As in the previously described embodiment, the gas flows over the outer surface of the wall 18 then enters the body 11 at its open end and passes through the base member 12 by way of the holes 28.

The base flange 15' in this embodiment has six radial holes, two 37 being shown in section, through a cylindrical wall 38 coaxial with and lying within the outlet filter 33. The gas passes from the holes 28 into an annular outlet chamber 39 formed between the base member 12 and the base flange 15', through the radial holes in the wall 38, through the outlet filter 33 and to the outlet 24 in a casing 21' that houses the body 11, the base member 12, and the magnetic shield 25'.

Two nylon sealing rings 40 and 41 located in grooves in the magnetic shield 25' prevent gas from the inlet passing directly to a space between the upper end of the shield and the casing 21' and to the outlet 24 respectively. Gas from the outlet filter 33 is prevented by the sealing ring 41 and the base flange 15' from passing out of the casing 21' other than by way of the outlet 24.

Two openings 42 and 43 in the casing 21' are provided to receive respectively a temperature sensing probe (not shown) and a pressure sensing device (not shown). The temperature sensing probe extends through an aperture 44 in the upper end of the magnetic shield 25' in FIG. 2 without preventing the passage of gas from within the shield 25' to the space between that end of the shield and the casing. Thus the pressure sensing device is exposed to the pressure of the gas in contact with the hollow body 11. The temperature sensing probe and the pressure sensing device are sealed into the openings 42 and 43 so that the gas cannot escape from the casing 21' by way of these openings.

Figure 3:
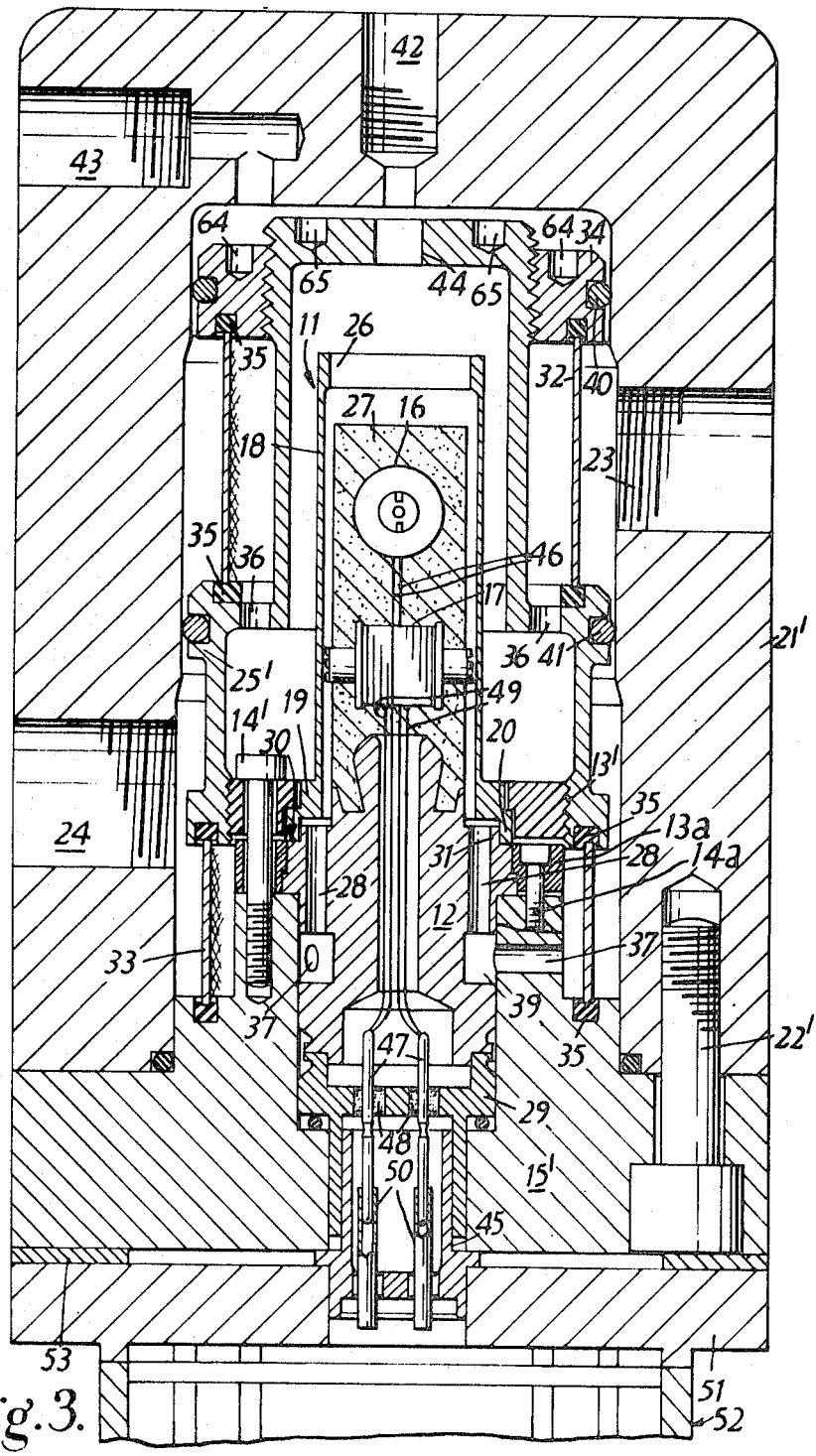
FIG. 3 is a longitudinal sectional view of part of the transducer of FIG. 2.

The connections of the coils 16 and 17 to an amplifier socket 45 are shown in FIG. 3. Two leads 46 from the ends of the drive coil 16 pass through the mass 27 of epoxy resin and the base member 12 to two gold-plated pins 47 secured in glass seals 48 in a wall of the plug 29.

The plug 29 is electron-beam welded to the base member 12 so that the mass 27 of epoxy resin, the base member 12, and the plug 29 form a unitary structure. To other leads 49 from the ends of the pick-up coil 17 similarly pass to two further gold-plated pins (behind the pins 47) secured in glass seals in the plug 29.

The four pins of the plug 29 make contact respectively with four gold-plated tubes by fitting therein. Two of these tubes, designated by the numeral 50, can be seen. Each tube is secured in a respective glass seal in a wall of the amplifier socket 45.

The amplifier socket 45 is located in an aperture in an end flange 51 of an amplifier housing 52. The end flange 51 is bolted to the base flange 15' by four bolts (not shown), an annular packing gasket 53 of synthetic rubber being sandwiched between the two flanges.

Figure 4:
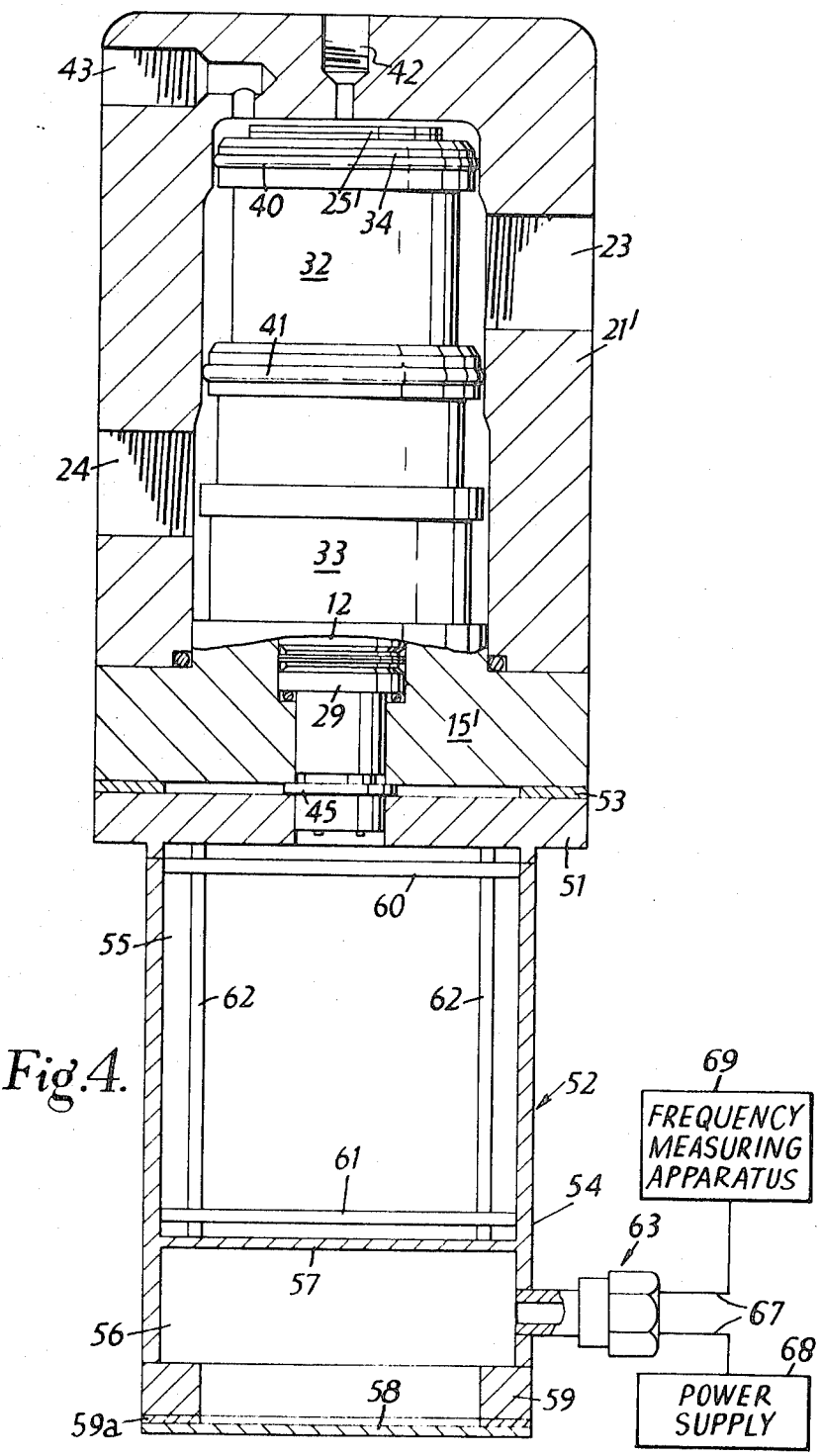
FIG. 4 is a longitudinally partly sectional and partly elevational view of the transducer of FIG. 2.

The amplifier housing 52 is shown in FIG. 4. The end flange 51 is electron-beam welded to a cylindrical tube 54 which is divided into two compartments 55 and 56 by a wall 57. The compartment 56 is closed by a cover plate 58 which is bolted to a heavy ring 59 electron-beam welded to the lower end of the tube 54 in FIG. 4. A sealing gasket 59a is interposed between the plate 58 and the ring 59.

A transistor amplifier comprising two circuit boards 60 and 61, on which the input and output stages are respectively mounted, separated by two rods 62 is housed in the compartment 55. The input stage of the amplifier is connected through two of the tubes of the amplifier plug 45 to the pick-up coil 17, and the output stage is likewise connected to the drive coil 16.

The compartment 56 houses a terminal block (not shown) from which leads (not shown) go to electrical connections extending through the wall 57, each such connection being secured in a glass seal. A cable 67 (schematically shown) is secured in a cable gland assembly 63 and has its conductors connected to the terminal block. In this way electrical paths are provided for supplying power from a supply 68 to the amplifier and for leading off a portion of the signal from the output stage to electrical frequency measuring apparatus 69.

The construction of the embodiment shown in FIGS. 2, 3 and 4 is convenient for the purpose of replacing or cleaning various elements. The amplifier housing 52 as a whole can be detached from the base flange 15' merely by unscrewing four bolts (not shown) in the end flange 51 and separating the housing 52 from the flange 15' so that the socket 45 is withdrawn from the plug 29. The casing 21' can be disengaged from the base 15' by unscrewing six bolts (one 22' being shown in FIG. 3) and removed to give access to the filters 52 and 33 and the magnetic shield 25'. The filter more likely to require cleaning or replacement is the inlet filter 32 and this can be released from the magnetic shield 25' by unscrewing the ring 34 from the shield 25'. Two sockets 64 are provided in the ring 34 to receive a tool for rotating the ring 34. to release the outlet filter 33 and expose the body 11, the magnetic shield 25' is unscrewed from the clamping ring 13'. Two sockets 65 are provided in the upper end of the shield 25' to receive a tool for rotating the shield.

Thereafter the body 11 can be released by unscrewing three bolts (one 14' of which is shown in FIG. 3). The unitary structure constituted by the mass 27 of epoxy resin, the base member 12, and the plug 29 can then be released from the base flange 15' by unscrewing three more bolts (one 14a of which is shown in FIG. 3).

A replacement of the amplifier housing 52 and contents can be effected in the field by an unskilled person without exposing the sensitive body 11. If it is necessary for the body 11 or the coils 16 and 17 to be replaced, a new unit including the base flange 15' filters 32 and 33 and magnetic shield 25' can be installed by an unskilled person in the field. Similarly replacement or removal for cleaning of the inlet filter 32 can be carried out without exposing the body 11.

The filters 32 and 35 in one practical embodiment as shown in FIGS. 2 to 4 are of "Porosint" (trademark) rigid mesh, 20 micron filter size, which can be obtained from Sintered Products Limited, Sutton in Ashfield, Nottinghamshire, England.

Other parts mentioned, unless otherwise stated, can be of stainless steel. The casing 21' may be of aluminium, and may be provided with a mounting plate 66 as shown in FIG. 2.

The material, Ni-Span-C 902 (trademark), from which the body 11 is produced by the Huntingdon Alloy Products Division of the International Nickel Company, Incorporated, of Huntingdon, W. Va., has the following limiting chemical composition.

|  | Percent |
|---|---|
| Nickel (plus cobalt) | 41.0–43.50 |
| Chromium | 4.90–5.75 |
| Titanium | 2.20–2.75 |
| Aluminium | 0.30–0.80 |
| Carbon (max.) | 0.06 |
| Manganese (max.) | 0.08 |
| Silicon (max.) | 1.00 |
| Sulphur (max.) | 0.04 |
| Phosphorus (max.) | 0.04 |
| Iron | Remainder |

Further details of the properties of Ni-Span-C 902 are given in Technical Bulletin T–31 of the Huntingdon Alloy Products Division.

The transistor amplifier comprising the circuit boards 60 and 61 constitutes the amplifying element of a closed loop which further includes the body 11 and the coils 16 and 17. The amplifier is designed to introduce a phase shift and is provided with output amplitude limitation as described hereinbefore in relation to FIG. 1 so that viscous damping has no effect on the frequency of vibration maintained. The details of the circuits of the amplifier and those of the power supply 68 and the frequency measuring apparatus 69 are not described in detail since suitable circuits are well known to those skilled in the art.

Where a transducer embodying the invention is to be used in measuring a difference in pressure, the hollow body may be closed at one end and an inlet provided for fluid at one pressure to enter the hollow body. The hollow body is housed in a casing having an inlet for fluid at the other pressure. The predominant frequency of vibration of the hollow body is then dependent upon the difference between the pressure inside the hollow body and the pressure outside the hollow body. If the fluid or fluids are flowing, the hollow body and the casing can be provided with separate outlets so that fluid can flow through each. The hollow body in this case can of course be open at each end.

For measuring a fluid pressure relative to some fixed standard, a transducer embodying the invention can be constructed as for measuring a difference in pressure, either the inlet to the casing or the hollow body being connected to a source of the fixed standard pressure. Alternatively, a quantity of gas at the fixed standard pressure can be sealed in the casing or the hollow body. This latter construction is not suitable where the sealed gas will be subject to temperature variation, unless it is intended that the standard pressure should vary with temperature. Transducers for measuring pressure or pressure differences can also be constructed in which the casing is dispensed with, the hollow body taking the form of a closed probe. Such probe-like transducers may be convenient where they can be installed in apparatus in which the hollow body will be protected from damage without the need for a casing.

Where in operation natural vibration of the resilient wall of the hollow body of a transducer embodying the invention is maintained by means of feedback from a pick-up coil to a drive coil, the predominant frequency of the vibrations can be measured by means of an electrical frequency meter, the frequency of the current supplied to the drive coil being the same as the predominant frequency of the vibrations of the wall. The frequency meter can be a conventional electrical frequency meter adapted to cover the range of predominant frequencies anticipated for the operation of the transducer and can be calibrated to read directly in density or pressure units from a calibration graph prepared from frequencies obtained when the resilient wall of the hollow body is in contact with fluids at standard densities or pressures as the case requires.

For a hollow body the predominant (resonant) frequency, $f$, is given approximately by the equation $$f^2 = f_0^2 \times \frac{(1+P/P_0)}{\left(1+\frac{D}{D_1}\right)\left(1+\frac{D'}{D_2}\right)}$$

where:

$f_0$ is constant,

P is the differential pressure taken to be positive when acting from the interior to the exterior of the hollow body, $P_0$ is a constant that depends on the size, shape, and material of the hollow body, D is the density of the fluid within the hollow body acting on the resilient wall, D' is the density of the fluid outside the hollow body acting on the resilent wall, and $D_1$ and $D_2$ are constants that depend upon the dimensions, material and shape of the hollow body.

The constants $P_0$, $D_1$, $D_2$ and $f_0$ can be determined empirically. Of these, $P_0$, $D_1$ and $D_2$ depend upon the thickness of the resilient wall.

Where an embodiment is to be used in an environment in which the temperature changes, a low rate of change of frequency with change of temperature can be obtained by machining the hollow body from a material having a low thermo-elastic coefficient for the anticipated temperature range, i.e. a material in which changes in the elasticity are balanced by dimensional changes over the anticipated temperature range. Ni-Span-C 902 (trademark) has a low thermo-elastic coefficient over a useful range of temperature.

Where an embodiment is to be used in constant temperature environment such material need not be used. Likewise, where an embodiment is to be used under conditions of constant viscous damping, it need not be made insensitive to changes in viscous damping.

FIG. 5 shows in section part of a transducer for measuring the pressure or pressure difference in fluids. Since the structure is substantially the same as that of the transducer decribed hereinbefore with reference to FIG. 1, corresponding parts are given corresponding reference numerals, and only the distingiushing features will be described now. In this transducer the hollow body 11 is closed at its free end by a thick end wall 26' which acts as a node-forming portion and prevents fluid from passing from the interior to the exterior or vice versa of the hollow body 11. The opening 24 in the base flange 15 now constitutes an inlet for fluid to reach the interior of the body 11 through the passages 28. Where a difference in pressure is to be measured, fluid at one pressure is admitted into the hollow body 11 through the opening 24, and fluid at the other pressure is admitted into the casing 21 through the inlet 23. The frequency of natural vibration of the body 11 is then observed as described hereinbefore. If necessary, corrections for the effect of the density of fluid within the hollow body and the density outside the hollow body can be made in accordance with the equation given above.

Where the pressure of a fluid is to be measured, a fluid at a predetermined pressure can be introduced into the hollow body 11 or the casing 21 by way of the opening 23 or 24 or a predetermined quantity of gas can be sealed therein by stopping up the opening 23 or 24, as mentioned hereinbefore.

Although the embodiments specifically described hereinbefore in detail are intended for measurements on gases, other embodiments can be constructed for carrying out measurements on liquids.

I claim:

1. In a transducer for measuring a characteristic of a fluid to be introduced thereinto, the improvement comprising:

a hollow body, of which a wall is relatively resilient, a relatively rigid base member, a relatively rigid node-forming portion connected to said relatively resilient wall of the hollow body, means for exciting natural vibration of the said relatively resilient wall, means for generating a signal representative of a frequency of the said vibration, a mounting structure secured to the base member, and elastically flexible connection means integrally attached to said node-forming portion and to said mounting structure for elastically and flexibly supporting said node-forming portion while assuring that said node-forming portion remains free from any direct contact with said base member.

2. The improvement defined in claim 1, wherein the mounting structure is integral with the node-forming portion.

3. The improvement defined in claim 2, wherein the hollow body is of right cylindrical form, the node-forming portion and the mounting structure are circular flanges, the mounting structure has an internal diameter equal to the external diameter of the node-forming portion, and said connection means being formed where the mounting structure and the node-forming portion overlap axially of the hollow body.

4. The improvement defined in claim 3, wherein a circular locating portion is provided in the base member, the circular locating portion fitting into the mounting structure, and the means for exciting vibrations and the means for generating a signal are mounted on the base member so as to be disposed at predetermined axial positions relative to the hollow body when the mounting structure is fitted on to the said circular locating portion.

5. The improvement defined in claim 1, wherein the means for exciting natural vibration and the means for generating a signal are electrical, and which further comprises a first protective housing for enclosing the hollow body, a second protective housing which is disengageably secured to the first protective housing, and an amplifier housed in the second protective housing, the amplifier being disengageably connected both to the means for exciting natural vibration and to the means for generating a signal in such a manner that the said vibration can be maintained by feedback through the amplifier and the amplifier can be disconnected from both of the said means by separating the second protective housing from the first protective housing.

6. The improvement defined in claim 5, wherein the first protective housing has a wall which is disengageably secured to the remainder of the first protective housing, the base member is disengageably secured to one side of the said disengageable wall, and the second protective housing is disengageably secured to the other side of the said disengageable wall.

7. The improvement defined in claim 6, further including a magnetic shield disengageably mounted on the said one side of the said disengageable wall, and at least partially surrounding said hollow body.

8. The improvement defined in claim 7, wherein a filter is disengageably mounted in an opening in the magnetic shield to enable any fluid introduced into the transducer to be filtered as it passes through said opening in said magnetic shield.

9. The improvement defined in claim 1, wherein the means for exciting natural vibration is a drive coil, the means for generating a signal is a pick-up coil, the said relatively resilient wall is cylindrical and of ferromagnetic material, the said node-forming portion bounds one end of the cylindrical wall, a further node-forming portion bounds the other end of the cylindrical wall, and the said coils are arranged to operate on the positions of respective anti-nodes which are equidistant from a nodal line encircling the cylindrical wall.

10. The improvement defined in claim 9, wherein the said relatively resilient wall is a right cylindrical wall, the coils have straight axes disposed perpendicular to the axis of the cylindrical wall and in respective planes which are perpendicular to one another, and the axes of the coils are set along those radii of the cylindrical wall at which the power required when the coils are coupled by an amplifier to excite the said vibration is at a minimum.

11. The improvement defined in claim 1, wherein the hollow body is at least partially disposed within a magnetic shield.

12. A transducer for measuring the density of a fluid, the transducer comprising:
 a tubular body formed of resilient material and open at at least one end,
 a substantially rigid base member,
 means for exciting natural vibration in a radial mode of the tubular body,
 means for generating a signal representative of a frequency of the said vibration, and
 means for conducting fluid to internal and external surfaces of the tubular body with substantially zero pressure differential through the walls of the hollow body,
 said tubular body having at one end thereof
  a substantially rigid node-forming portion connected to said resilient tubular body,
  a mounting structure disengageably secured to said base member, and
  elastically flexible connection means disposed between and integrally attached to the node-forming portion and to the mounting structure to elastically and flexibly support said node-forming portion while assuring that said node-forming portion remains free from any direct contact with said base member.

13. A transducer as claimed in claim 12, wherein the mounting structure is clamped to the base member solely by clamping forces exerted axially of said tubular body.

14. A transducer as claimed in claim 12, wherein there is a first protective housing and the said means for conducting fluid includes a fluid inlet in the first protective housing, the tubular body and the base member being mounted within said first protective housing.

15. A transducer as claimed in claim 14, wherein the first means for conducting fluid further includes a fluid outlet in said first protective housing, and flow passage means in said first protective housing establishing a fluid flow path between said fluid inlet and said fluid outlet.

16. A transducer as claimed in claim 15, wherein said first protective housing includes a wall which is disengageably secured to the remainder of said first protective housing, and the base member is mounted on the said disengageable wall.

17. A transducer as claimed in claim 16, wherein the mounting structure is disengageably secured to the base member by clamping ring means which engages against said mounting structure and clamps said mounting structure against said base member by said clamping forces.

18. A transducer as claimed in claim 16, wherein the said passage means includes at least one passage through the base member.

19. A transducer as claimed in claim 16, further including a magnetic shield disposed within said first protective housing and at least partially surrounding said tubular body.

20. A transducer as claimed in claim 19, wherein the said passage means includes at least one passage through the magnetic shield, and a fluid filter is disengageably mounted across said passage through the magnetic shield.

21. A transducer as claimed in claim 16, wherein the means for exciting natural vibration and the means for generating a signal are electrical, a second protective housing is provided which is disengageably secured to the said disengageable wall, and an amplifier is housed in the second protective housing, the amplifier being disengageably electrically connected to the means for exciting natural vibration and the means for generating a signal in such a manner that the said vibration can be maintained by feedback through the amplifier and the amplifier can be disconnected from the said means by disengaging the second protective housing from said disengageable wall.

22. A transducer as claimed in claim 12, wherein the tubular body is at least partially disposed within a magnetic shield.

23. A fluid pressure transducer comprising:
 a tubular body formed of resilient material,
 a substantially rigid base member,
 means for exciting natural vibration in a radial mode of the tubular body,
 means for generating a signal representative of a frequency of the said vibration, and
 means for communicating fluid pressure to the tubular body, said tubular body having at one end thereof:
  a substantially rigid node-forming portion integrally connected to said tubular body,
  a mounting structure disengageably secured to said base member, and
  elastically flexible connection means disposed between and integrally attached to the node-forming portion and to the mounting structure to elastically and flexibly support said node-forming portion while assuring that said node-forming portion remains free from any direct contact with said base member.

24. A transducer as claimed in claim 23, wherein the tubular body is closed at the end opposite said one end.

25. A transducer as claimed in claim 24, wherein there is a first protective housing and the said means for conducting fluid includes a fluid inlet in the first protective housing, the tubular body and the base member being mounted within said first protective housing.

26. A transducer as claimed in claim 25, wherein the said means for conducting fluid further includes a fluid outlet in said first protective housing, and flow passage means in said first protective housing establishing a fluid flow path between said fluid inlet and said fluid outlet.

27. A transducer as claimed in claim 26, wherein the said housing includes a wall which is disengageably secured to the remainder of said first protective housing, and the base member is mounted on the said disengageable wall.

28. A transducer as claimed in claim 27, wherein the mounting structure is disengageably secured to the base member by clamping means which exert clamping forces axially of said tubular body.

29. A transducer as claimed in claim 27, wherein the said passage means includes at least one passage through the base member.

30. A transducer as claimed in claim 23, wherein the tubular body is at least partially disposed within a magnetic shield.

31. A hollow body for use in a transducer for measuring a characteristic of a fluid, the body including:
 a relatively resilient elongated wall,
 a relatively rigid node-forming portion integrally connected to said resilient elongated wall at one end thereof,
 a mounting structure adapted to mount said body to a supporting base member, and elastically flexible connection means integrally attached to said node-forming portion and to said mounting structure to permit said node-forming portion to elastically and flexibly move relatively to said mounting structure.

32. A hollow body as claimed in claim 31, wherein the resilient elongated wall is of right cylindrical form and wherein said node-forming portion is a circular flange having an inside diameter axially coextensive with the inside diameter of said elongated wall.

33. A hollow body as claimed in claim 32, wherein the mounting structure includes a circular portion connected by said connection means to said circular flange, said circular portion having an inside diameter axially coextensive with the outside diameter of said circular flange.

34. A transducer for measuring a characteristic of a fluid, the transducer comprising:
  (a) a resilient hollow right cylindrical body,
  (b) a relatively rigid annular node-forming flange formed at one end of the cylindrical body and integral therewith,
  (c) a relatively rigid annular mounting flange integral with the node-forming flange, the internal diameter of the mounting flange corresponding to the external diameter of the node-forming flange and the said flanges partially overlapping one another axially of the cylindrical body,
  (d) a relatively rigid base member,
  (e) circular locating means on the base member to locate the mounting flange on the base member,
  (f) clamping means located on the mounting flange and clamping the mounting flange to the base member, clearance being provided between on the one hand the node-forming flange and on the other hand the mounting flange and the base member, and the said overlapping providing an elastically flexible connection between the node-forming flange and the mounting flange,
  (g) means for exciting natural vibration in a radial mode of the said cylindrical body,
  (h) means for generating a signal representative of the said vibration, and
  (i) means for communicating the fluid whose characteristics are to be measured into contact with said cylindrical body.

35. In a transducer arranged to generate a frequency of vibration which is a measure of a characteristic of a fluid, including an elongated hollow body capable of being set into vibration and means for supplying fluid into contact with the body during vibration thereof, the improvement in said hollow body which comprises:

said hollow body having a relatively resilient wall, a relatively rigid node-forming portion integrally connected to said resilient elongated wall at one end thereof, a mounting structure adapted to mount said body to a supporting base member, and elastically flexible connection means integrally attached to said node-forming portion and to said mounting structure to permit said node-forming portion to elastically and flexibly move relatively to said mounting structure.

References Cited

UNITED STATES PATENTS

| | | | |
|---|---|---|---|
| 3,021,711 | 2/1962 | Arvidson | 73—32 X |
| 3,199,355 | 8/1965 | Simon-Suisse | 73—398 X |
| 3,218,851 | 11/1965 | Sipin | 73—32 X |
| 3,282,084 | 11/1966 | Banks | 73—59 X |
| 3,420,092 | 1/1969 | Dorsch | 73—30 X |
| 3,444,723 | 5/1969 | Wakefield | 73—32 |
| 3,516,283 | 6/1970 | Abbotts | 73—30 |
| 3,298,221 | 1/1967 | Miller | 73—32 |

RICHARD C. QUEISSER, Primary Examiner

C. E. SNEE III, Assistant Examiner

U.S. Cl. X.R.

73—30, 194 B, 398 R